Sept. 16, 1941. S. H. MAKUS ET AL 2,255,853
FISHING LINE BOBBER
Filed March 26, 1941
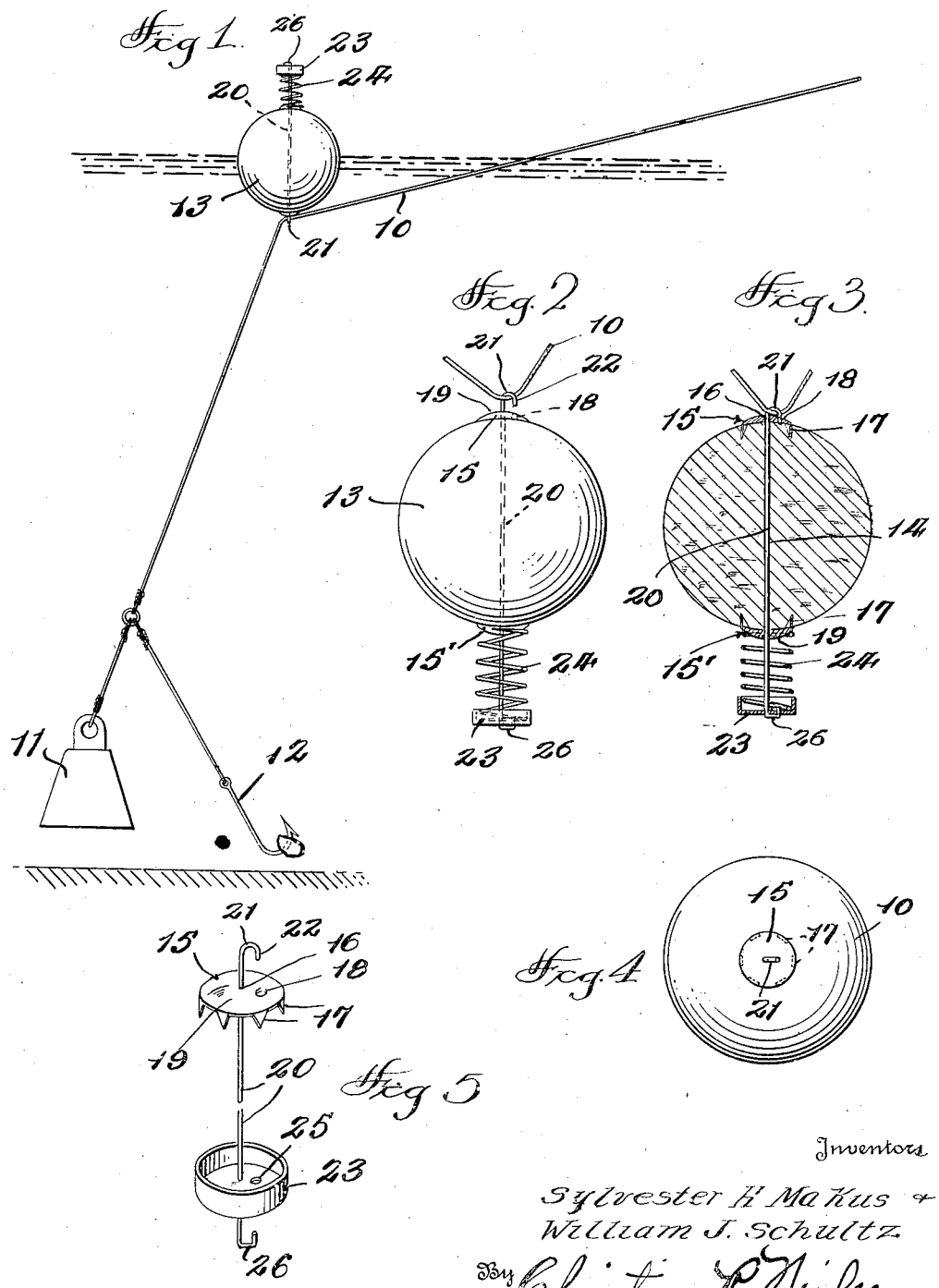

Patented Sept. 16, 1941

2,255,853

UNITED STATES PATENT OFFICE 2,255,853

FISHING LINE BOBBER

Sylvester H. Makus and William J. Schultz, Milwaukee, Wis.

Application March 26, 1941, Serial No. 385,368

1 Claim. (Cl. 43—49)

This invention relates to a float or cork for a fishing line and it consists in the constructions, arrangements and combinations herein described and claimed.

Fishermen have long felt the need for a float or bobber which can be quickly adjusted to various positions upon a line, or completely removed from the line, if desired, and to this end we have provided a bobber having a spring-pressed line gripping means which will effectively secure the bobber to a line and readily actuated to release the line for adjustment or removal of the bobber.

It is an important object of the invention to provide a bobber in which a single strand of bronze wire is reciprocable, under spring tension, having means at one end for gripping a fish line, and including bearing plates for grinding and maintaining the wire in operative position.

It is also an object of the invention to provide a bobber which will automatically indicate to the fisherman that the bobber is adjusted to an improper depth.

Additional objects, advantages and features of invention will be apparent from the following description, considered in conjunction with the accompanying drawing, wherein Figure 1 is a perspective view illustrating the bobber in use.

Figure 2 is an enlarged side elevation of the bobber.

Figure 3 is a vertical cross section.

Figure 4 is a top plan view.

Figure 5 is a perspective view of the line attaching means detached from the bobber, with one of the bearing plates removed.

There is illustrated in Figure 1, a fish line 10 having a sinker 11 and hook 12 as is customary. Upon the line 10 there is secured our bobber 13, which consists of a spherical cork, such as may now be purchased. The bobber 13 is provided with an axial bore 14 through which the line 10 is ordinarily threaded. In our construction however, the bore 14 functions for mounting of the line attaching means as will now be described.

Upon the bobber 13 there are secured bearing plates 15 and 15', each of which has a medial opening 16 alined with the bore 14. The plates 15 and 15' may be stamped from a suitable sheet material, such as brass, right angular prongs 17 being formed integrally about the periphery of the plates. The prongs are of a length to penetrate the cork a suitable distance, for maintenance of the plates in alinement with the bore. The plate 15, in addition, has an opening 18 for a purpose presently to be explained. The plates preferably have an arcuate outer face 19.

A bronze wire strand 20 is positioned in the bore 14, the upper end of which is bent to form an open hook 21, the leg 22 of which cooperates with the opening 18 for retention of the line 10, as will be explained. The strand 20 is of a length greater than the diameter of the ball cork so as to project therebeyond and has fixed at the lower end a cup washer 23 forming a seat for one end of a helical spring 24, the other end of the spring seating against the arcuate face 19 of the plate 15'.

The cup washer 23 in the present instance is shown as having an axial opening for reception of the strand 20 and an offset opening 25, adapted to receive a hook 26 formed in the wire, the latter being bent inwardly into the inner face of the washer, as shown in Figure 3. The parts are thus securely mounted to the bobber.

In use, it is only necessary to apply pressure to the washer 23 so as to compress the spring, which obviously forces the strand 20 so as to move the hook 21 outwardly, and also moving the leg 22 from engagement with the hole 18. The line 10 may now be inserted within the hook 21 and release of pressure upon the spring will allow the strand to move downwardly again to retain the strand within the hook. When adjustment of the bobber is required, complete removal of the line is not necessary, since only a light compression of the spring will release the line. The formation of the arcuate face upon the plates 15 and 15' provides a smooth surface for gripping of the line, in the first instance, avoiding chafing or abrasion of the line, and a smooth contacting face for the spring in the second instance.

When the bobber is adjusted upon a line, the spring and associated parts and approximately half of the bobber will be presented above the surface of the water, as shown in Figure 1.

While we have shown and described the invention specifically, this is for the purpose of illustration only, and we consider as our own, all such modifications in construction as fairly fall within the scope of the appended claim.

We claim:

A fish line bobber comprising a spherical float body having a bore therethrough, a bearing washer at the ends of the bore and aligned therewith, said washers having prongs for penetration of the float body for maintaining the washer aligned with the bore, each washer having an arcuate outer face, one of said washers having an offset opening, a wire strand slidably engaged through the washers and the bore, said strand having a downwardly open hook at one end defining a leg complemental to the offset opening in the washer, the strand having a length greater than the diameter of the spherical float body, a cup washer fixed to the other end of the strand, and a helical spring encircling the strand interposed between the cup washer and arcuate face of the other washer, whereby to draw the leg into the offset opening for gripping action upon the line disposed within the hook.

SYLVESTER H. MAKUS.
WILLIAM J. SCHULTZ.